July 31, 1934.  E. E. WEMP  1,968,274
CLUTCH CONTROL
Filed July 8, 1931  2 Sheets-Sheet 2

INVENTOR.
ERNEST E. WEMP.
BY Barnes and Kisselle
ATTORNEYS.

Patented July 31, 1934

1,968,274

UNITED STATES PATENT OFFICE 1,968,274

CLUTCH CONTROL

Ernest E. Wemp, Detroit, Mich.

Application July 8, 1931, Serial No. 549,546

5 Claims. (Cl. 192—111)

This invention relates to a construction for operating a clutch and for compensating for clutch wear. The invention has to do particularly with a clutch in an automotive vehicle. In such vehicles the clutch is usually controlled by a foot lever which is depressed to release the clutch and released to permit clutch engagement. The engaging surfaces of the clutch are subject to wear, the wear taking place particularly in clutch facing material, and as such wear takes place the position of the operating parts in full clutch engagement creeps or shifts. As this action continues the operating lever strikes the toe boards of the car and upon further wear of the clutch facing material the lever is pushed against the floor boards of the car by the clutch packing springs with the result that only part of the force exerted by the clutch packing springs is effective for engaging the clutch. In other words, the clutch is only partially engaged. This results in clutch slippage during vehicle operation and within a relatively short while the clutch facings are material worn and damaged. This has been found to be one of the most prevalent causes of clutch trouble.

The present invention contemplates means for operatively connecting the clutch and its controlling lever, of such a nature as to automatically take care of this situation. In accordance with the invention a construction is provided in which the clutch lever may always return to a normal position determined by a stop which may be the floor boards of the vehicle, and in this position clutch operating parts associated with the lever may move independently of the lever upon clutch facing wear. In other words, as the clutch facing wears there is a gradual and progressive shifting of relative positions as between the lever and parts immediately associated therewith, and the clutch and parts immediately associated with the clutch.

In the accompanying drawings:

Fig. 4 is a section showing a detail construction taken substantially on line 4—4 of Fig. 3.

Figure 1:
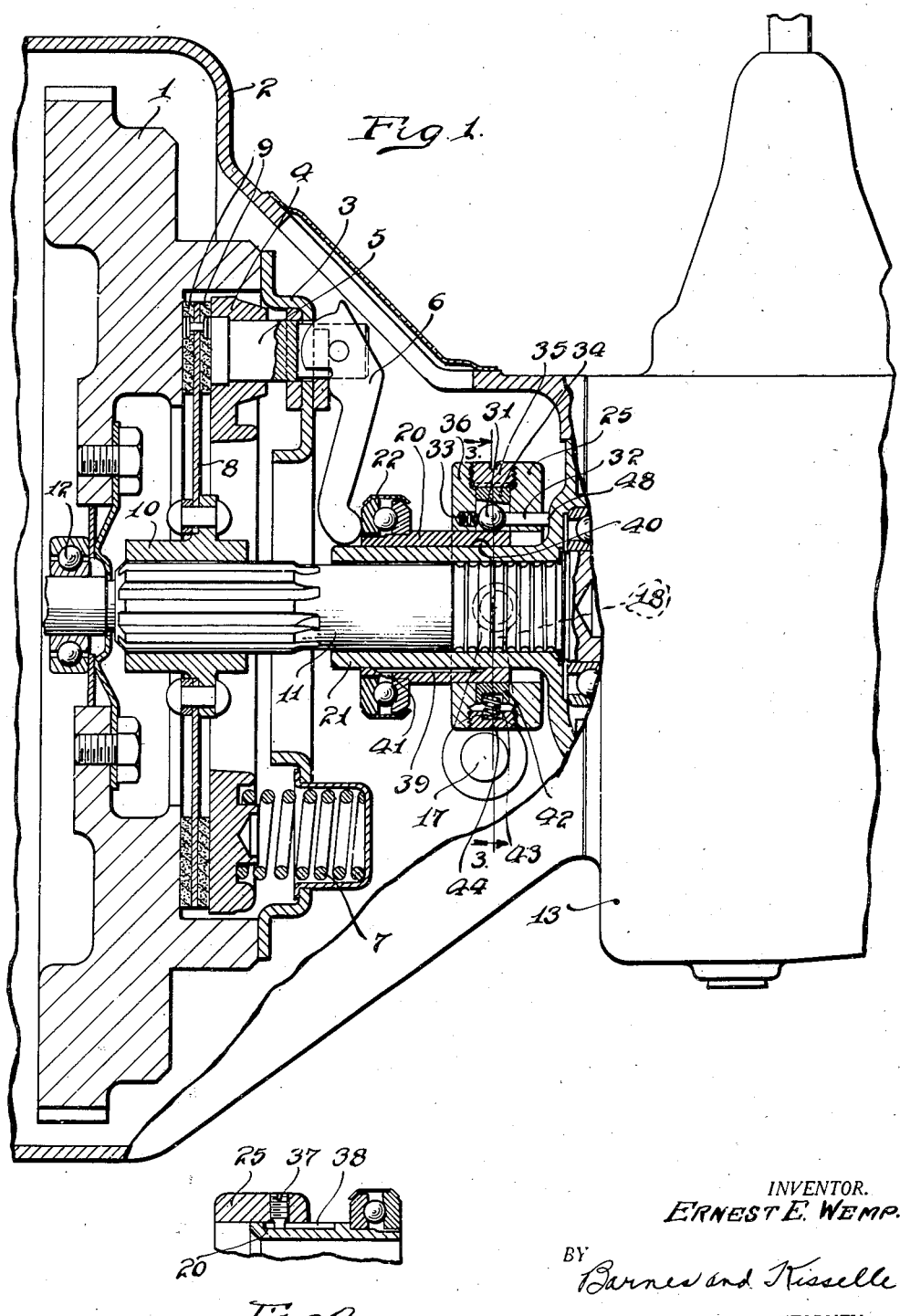
Fig. 1 is a sectional view illustrating a more or less conventional type of clutch showing the control mechanism therefor.

The particular structural features of the clutch may take a number of forms and one form has been selected for depicting the present invention. Such a form comprises an engine flywheel 1 disposed in a housing 2, and carried by the flywheel is a cover plate 3. A pressure ring 4 is carried by studs 5 axially shiftable in the cover plate by means of clutch releasing levers 6. There may be a number of studs 5 with a corresponding number of levers 6. The pressure ring 4 is acted upon by packing springs 7, of which there may be a suitable number arranged in circumferential spaced manner. A driven clutch member 8 may carry clutch facing material 9, and the driven member 8 may include a hub 10 which may be splined to a driven shaft 11. The driven shaft may be journaled at one end in the flywheel as by means of an antifriction bearing 12, and its other end may extend into gear case or transmission 13. This represents a more or less conventional type of clutch and the operation is well understood by those skilled in the art which is as follows: the springs 7 pack the pressure ring toward the flywheel and the friction material 9 is frictionally engaged between the pressure ring and a portion of the flywheel to drive the driven clutch member and shaft 11; the clutch is released by rocking the levers 6 clockwise as Fig. 1 is viewed, thus retracting the pressure ring 4 against the action of the packing springs 7, releasing the driven clutch member.

Figure 2:
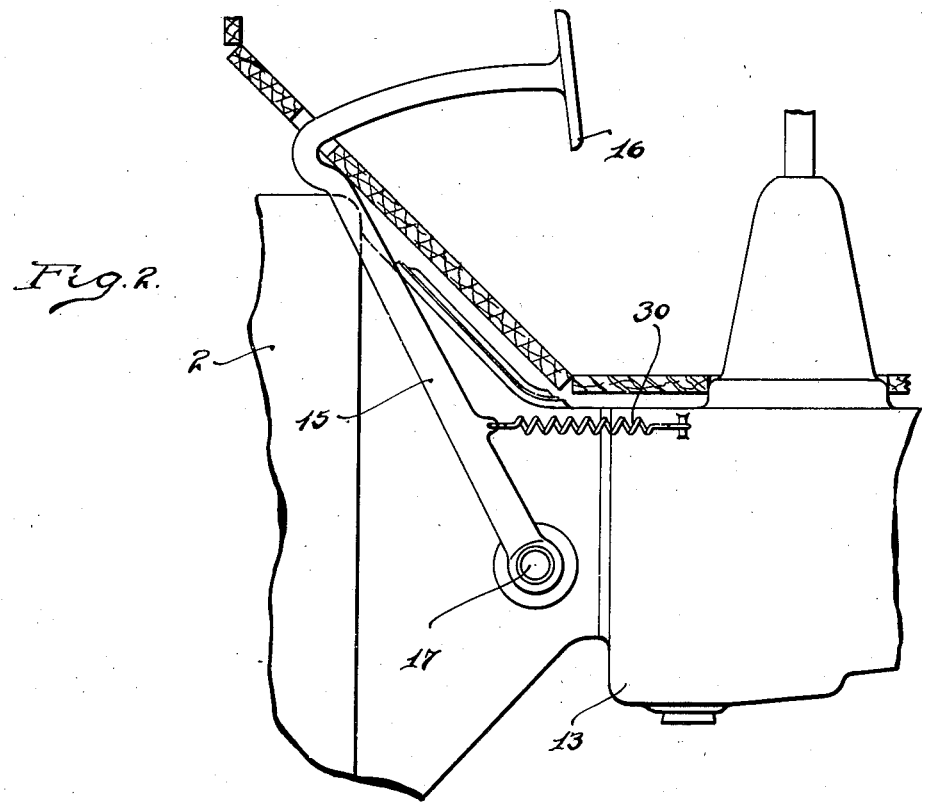
Fig. 2 is a view in illustration of the control lever.
Figure 3:
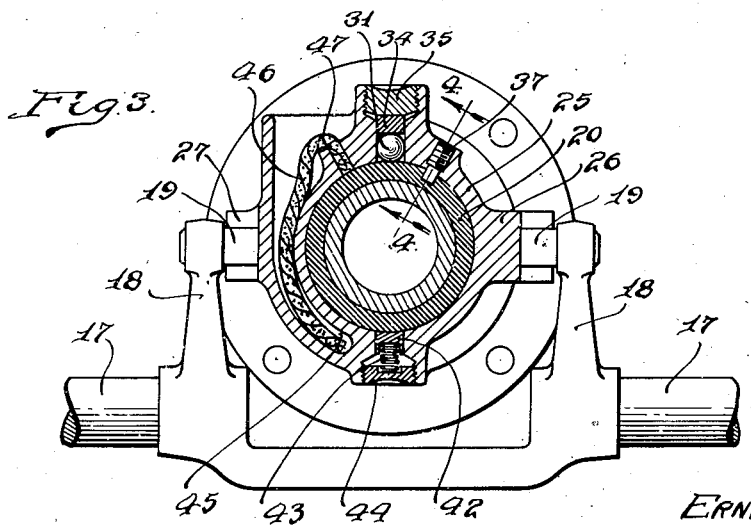
Fig. 3 is a sectional view taken through the control mechanism.

A clutch releasing lever is shown at 15 (Fig. 2) having a pedal 16, and this lever may be rigidly attached to a clutch control shaft 17. Rigidly fixed to the control shaft 17 is a forked member having arms 18 with studs 19.

There is an axially shiftable member which may be in the form of a sleeve 20, and this may be mounted upon the projecting part 21 of the transmission case 13. This member 20 is shiftable for rocking the levers 6 for the purpose of which an anti-friction bearing 22 may be provided for engaging the levers. Around the sleeve 20 there is a member which may be termed a collar; this member is shown at 25, and it has projecting parts 26 and 27 which are slotted and in which the pins 19 fit. It will be noted that if the pedal 16 is depressed that the arms 18 are rocked and the collar 25 shifted by means of the pins 19. The slotted portions 26 and 27 permit of the pins to move in an arcuate path, while the member 25 moves in a rectilinear path, and the collar 25 is moved positively with the lever when it is depressed or when it is retracted. The lever, it may be pointed out, may be retracted by a retracting spring 30.

An operable connection is provided between the sleeve 20 and the collar 25 capable of permitting these two members to shift relative to each other for compensating for wear in the clutch facings. The collar 25 may be provided with a radially extending bore in which is located a clutch member which may take the form of a ball 31. Communicating into the bore is an axially extending aperture in which is fitted a pin 32 for free sliding action, and the pin is designed to contact with the ball as shown. On the opposite side of the ball there may be a small coil spring 33. A wedge block 34 is positioned in the bore having a surface which may be inclined relative to the axis of the rotating parts for contacting with the ball, and the parts may be retained in the bore by a screw threaded plug 35 which may be adjusted and maintained in adjustment by a set screw (not shown).

The sleeve 20 and collar 25 are held against relative rotation, and for this purpose means such as a screw threaded member 37, may be taken through a portion of the collar 25 having a projecting end slidable in the slot 38 in sleeve 20 (see Fig. 4).

In order that sleeve 20 and collar 25 may be held normally from free relative axial movement, yet permitting relative axial movement when necessary, means for establishing friction between the two may be provided. Such means may take the form of a piece of friction material in the nature of a plug 42 acted upon by spring 43 and backed up by screw threaded plug 44. The member 25 may be provided with a well 45 for the purpose of containing a lubricant, and a wick 46 projecting into the well may extend through the collar 25, as at 47, so as to wipe the member 20 thus furnishing lubrication means as between the member 20 and collar 25.

The operation is as follows: As shown in Fig. 1 the parts are in clutch-engaged position with the lever 15 retracted by spring 30 until it contacts with a stop which in the present instance is constituted by the toe boards as shown. In this position the collar 25 has been retracted until the pin 32 strikes the flanged end of projecting part 21 which is fixed and carried by the transmission case 13. As the collar retracts from left to right with the pin striking the fixed portion, as at 48, the pin is shifted axially relative to the collar 25 thus serving to shift the ball 31 against the action of spring 33, and releasing the wedging action. To release the clutch the pedal 16 is depressed; the first thing that happens is movement of collar 25 to the left, and in which action the spring 33 urges the ball against the inclined surface of plug 34. When the pin 32 is entirely released from the housing part 48, spring 33 wedges the ball between the surface of the collar 20 and wedge 34 thus tying the collar and sleeve together. Further depressing the pedal 16 causes the member 25 to shift sleeve 20 to the left as Fig. 1 is viewed thus rocking levers 6 and releasing the clutch. When the clutch is re-engaged the lever 15 is allowed to retract in the usual manner until such time as it strikes the toe boards, and the collar 25 moves to the right until pin 32 actuates ball 31 against the spring and the connection between the sleeve 20 and collar 25 is disrupted. If, for example, in this release and engagement of the clutch the clutch facings have been worn excessively, it follows that the sleeve 20 must move to a position further to the right than its initial position in order to permit the pressure ring to move up against the clutch facings under full power of the springs 7. This is permitted as the levers 6 serve to position the sleeve 20 to the right relative to collar 25, which is permitted by reason of the wedge engagement between the collar 25 and the sleeve 20 having been released. Then the next time the clutch is to be released the same cycle of movements occurs, but the ball 31 takes a new bite upon the sleeve 20. Accordingly, in a long period of vehicle operation the sleeve 20 may creep or shift back to permit of full engagement of the clutch while the collar 25 and lever 16 return always to the same position. The friction provided by the plug 42 keeps the collar and sleeve in snug engagement, yet it is easily overcome by the clutch packing springs to shift the sleeve relative to the collar. The sleeve 20 may be channeled, as at 39 and 40, with the channel 39 in communication with anti-friction bearing 22 as by means of an aperture 41 serving to provide lubricant passageways for lubricating between the sleeve 20 and projecting portion 21.

I claim:

1. The combination with a clutch including driving parts and a driven shaft, a sleeve shiftable axially for controlling the engagement and release of the clutch, a collar over the sleeve, means for shifting the collar axially, means for limiting the movement of the collar in clutch engaged position, means establishing an operable connection between the collar and the sleeve whereby movement of the collar may shift the sleeve to control the clutch, and means for breaking the operable connection when the collar is in its clutch engaged position whereby the sleeve may shift axially relative to the collar.

2. The combination with a clutch having driving and driven parts including a driven shaft, a sleeve movable axially to control clutch engagement and release, a collar around the sleeve, a wedge member, an element acted upon by the wedge member for establishing an operable connection between the collar and sleeve, and means acting upon said element for releasing said operable connection in clutch engaged position where by the sleeve may shift relative to the collar.

3. Clutch operating means comprising an axially shiftable member, a collar around the member, a wedge carried by the collar, a ball between the wedge and the shiftable member, a spring acting upon the ball and forcing it between the wedge member and slidable member for establishing an operable connection between collar and slidable means, means for moving the collar to actuate the slidable member, a plunger carried by the collar, and fixed means for actuating the plunger when the collar is in clutch engaged position, said plunger shifting said ball against said spring and releasing the operable connection.

4. Clutch operating means comprising an axially shiftable member, a collar around the member, a wedge carried by the collar, a ball between the wedge and the shiftable member, a spring acting upon the ball and forcing it between the wedge member and slidable member for establishing an operable connection between collar and slidable means, means for moving the collar to actuate the slidable member, a plunger carried by the collar, fixed means for actuating the plunger when the collar is in clutch engaged position, said plunger shifting said ball against said spring and releasing the operable connection, and friction means between the collar and shiftable member.

5. Means for controlling the engagement and release of a normally engaged rotary clutch having driving and driven parts, some of which are subject to wear, which comprises in combination with clutch releasing levers, a driven shaft, a nonrotatable fixed support in axial alignment with the clutch parts through which the driven shaft extends, an axially shiftable member on the support for engaging the levers and which is adapted to be shifted in one direction by the levers when the clutch engages, a control member adapted to be shifted axially in the opposite direction, clutching means for establishing a driving connection between the shiftable member and control member so that the shiftable member shifts the control member as the clutch engages and the control member shifts the shiftable member in the opposite direction, whereby the shiftable member acts upon the levers to release the clutch, and stop means for acting upon said clutching means to render the same ineffective when the shiftable member and control member are positioned by the clutch levers when the clutch is engaged, whereby the shiftable member may shift relative to the control member to compensate for wear, and said clutching means being arranged to establish the driving connection upon initial movement of the control member as it is moved in said opposite direction to effect release of the clutch.

ERNEST E. WEMP.